US008423265B2

(12) United States Patent
Aso et al.

(10) Patent No.: US 8,423,265 B2
(45) Date of Patent: Apr. 16, 2013

(54) CONTROL SYSTEM OF INTERNAL COMBUSTION ENGINE

(75) Inventors: Koji Aso, Susono (JP); Takahiko Fujiwara, Susono (JP); Hiroshi Tanaka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 454 days.

(21) Appl. No.: 12/785,025

(22) Filed: May 21, 2010

(65) Prior Publication Data

US 2011/0283684 A1  Nov. 24, 2011

(51) Int. Cl.
G06F 19/00 (2011.01)
F02D 41/12 (2006.01)
F02M 51/00 (2006.01)
F02B 43/10 (2006.01)
F01N 3/18 (2006.01)
F01N 3/36 (2006.01)

(52) U.S. Cl.
USPC ................ 701/104; 123/1 A; 123/3; 123/304; 123/493; 60/285; 60/286; 701/110

(58) Field of Classification Search .................. 123/1 A, 123/3, 299, 300, 304, 305, 478, 480, 493, 123/575; 701/102–105, 110; 60/274, 276, 60/277, 284–286, 299, 303
See application file for complete search history.

(56) References Cited

U.S. PATENT DOCUMENTS

| 2009/0107121 | A1* | 4/2009 | Yoshida et al. ................. 60/286 |
| 2010/0288211 | A1* | 11/2010 | Agosta .............................. 123/3 |
| 2011/0023855 | A1* | 2/2011 | Van Nieuwstadt et al. ...... 60/276 |
| 2011/0259290 | A1* | 10/2011 | Michikawauchi et al. ... 123/1 A |
| 2011/0283959 | A1* | 11/2011 | Aso et al. .......................... 123/3 |

FOREIGN PATENT DOCUMENTS

| JP | A-5-332152 | 12/1993 |
| JP | A-2007-239671 | 9/2007 |
| JP | A-2009-85169 | 4/2009 |

* cited by examiner

*Primary Examiner* — Willis R Wolfe, Jr.
(74) *Attorney, Agent, or Firm* — Oliff & Berridge, PLC (57) ABSTRACT

A control system of an internal combustion engine in which a first fuel of ammonia and a second fuel which is easier to burn than ammonia are used as fuels. An ammonia ratio is usually set to a reference ammonia ratio which is determined in advance in accordance with an operating state of an engine. At the time when feed of the fuel is restarted after suspension of feed of the fuel at the time of deceleration, the ammonia ratio is temporarily made lower than the reference ammonia ratio in accordance with the operating state of the engine.

8 Claims, 12 Drawing Sheets

CONTROL SYSTEM OF INTERNAL COMBUSTION ENGINE

BACKGROUND OF THE INVENTION

1. Field of the Invention

The present invention relates to a control system of an internal combustion engine.

2. Description of the Related Art

In an internal combustion engine, in the past, the fuel used has mainly been fossil fuels. However, in this case, burning such fuels produces $CO_2$, which causes global warming. On the other hand, burning ammonia does not produce $CO_2$ at all. Thus, there is known an internal combustion engine made so as to use ammonia as fuel and not produce $CO_2$ (for example, see Japanese Patent Publication (A) No. 5-332152.).

However, ammonia is harder to burn compared with fossil fuels. Therefore, when using ammonia as fuel, some sort of measure is required for making the ammonia easier to burn. Thus, in the above-mentioned internal combustion engine, exhaust heat is utilized to reform the ammonia so as to produce reformed gas comprised of hydrogen and nitrogen, the hydrogen in the produced reformed gas is stored in a hydrogen storing alloy, and the hydrogen stored in the hydrogen storing alloy is fed together with the ammonia in a combustion chamber so as to enable easier combustion even when using ammonia as fuel.

In this regard, $CO_2$ is not produced even if burning ammonia as explained above. However, if burning ammonia, $N_2O$ exerting an influence upon global warming is produced. In this case, however, when an exhaust purification catalyst arranged in an engine exhaust passage is activated and the air-fuel ratio of exhaust gas in the exhaust purification catalyst is the stoichiometric air-fuel ratio or rich, the $N_2O$ produced in a combustion chamber is reduced in the exhaust purification catalyst. Accordingly, at this time, almost no $N_2O$ is discharged into the atmosphere.

Contrary to this, when the inside of the exhaust purification catalyst becomes a state of excessive oxygen, that is, a lean state, almost no $N_2O$ is reduced in the exhaust purification catalyst. Accordingly, the risk arises that the $N_2O$ will be discharged into the atmosphere. Further, when the exhaust purification catalyst is not activated as well, almost no $N_2O$ is reduced in the exhaust purification catalyst. Accordingly, in this case as well, there is a risk that $N_2O$ will be discharged into the atmosphere.

The present invention is to provide a control system of an internal combustion engine suppressing discharge of $N_2O$ into the atmosphere.

In a first aspect of the invention, there is provided a control system of an internal combustion engine using as a fuel a first fuel of ammonia and a second fuel which is easier to burn than ammonia and feeding these two types of fuel into a combustion chamber to burn, wherein a reference ammonia ratio indicating a ratio of an amount of ammonia fed to a total amount of fuels fed is set in advance in accordance with an operating state of the engine, an ammonia ratio is usually set to the reference ammonia ratio in accordance with the operating state of the engine, and the ammonia ratio is temporarily made lower than the reference ammonia ratio in accordance with the operating state of the engine at the time when feed of the fuels is restarted after feed of the fuels is suspended at the time of deceleration.

In a second aspect of the invention, there is provided a control system of an internal combustion engine using as a fuel a first fuel of ammonia and a second fuel which is easier to burn than ammonia and feeding these two types of fuels into a combustion chamber to burn, wherein the fuels are injected toward an interior of an intake port of each cylinder so that normally, an injection is completed before opening of a corresponding intake valve and, at the time when feed of the fuels is restarted after feed of the fuels is suspended at the time of deceleration, an air-fuel ratio is temporarily made rich and an injection action of the fuel is carried out for at least a cylinder to which the fuel should be fed first even when an injection end timing of the fuel is during opening of an intake valve.

In a third aspect of the invention, there is provided a control system of an internal combustion engine using as a fuel a first fuel of ammonia and a second fuel which is easier to burn than ammonia and feeding these two types of fuels into a combustion chamber to burn, wherein a reference ammonia ratio indicating a ratio of an amount of ammonia fed to a total amount of fuels fed is set in advance in accordance with an operating state of the engine, an ammonia ratio is normally set to the reference ammonia ratio in accordance with the operating state of the engine, and the ammonia ratio is made lower than the reference ammonia ratio in accordance with the operating state of the engine at the time when a temperature of an exhaust purification catalyst arranged in an engine exhaust passage is lower than a predetermined set temperature.

In an engine, when feed of the fuels is restarted after feed of the fuels is suspended at the time of deceleration, the interior of the exhaust purification catalyst has become a lean state. Accordingly, at this time, if $N_2O$ is produced in a combustion chamber, the $N_2O$ is discharged into the atmosphere. Accordingly, in the first aspect of the invention, at this time, the ammonia ratio is lowered so that the amount of production of $N_2O$ is suppressed, while in the second aspect of the invention, the air-fuel ratio of the exhaust gas in the exhaust purification catalyst is made the stoichiometric air-fuel ratio or rich at an early stage so that the amount of discharge of $N_2O$ into the atmosphere is suppressed. Further, in the third aspect of the invention, when the exhaust purification catalyst is not activated, the ammonia ratio is lowered so that the amount of production of $N_2O$ is suppressed.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Figure 1:
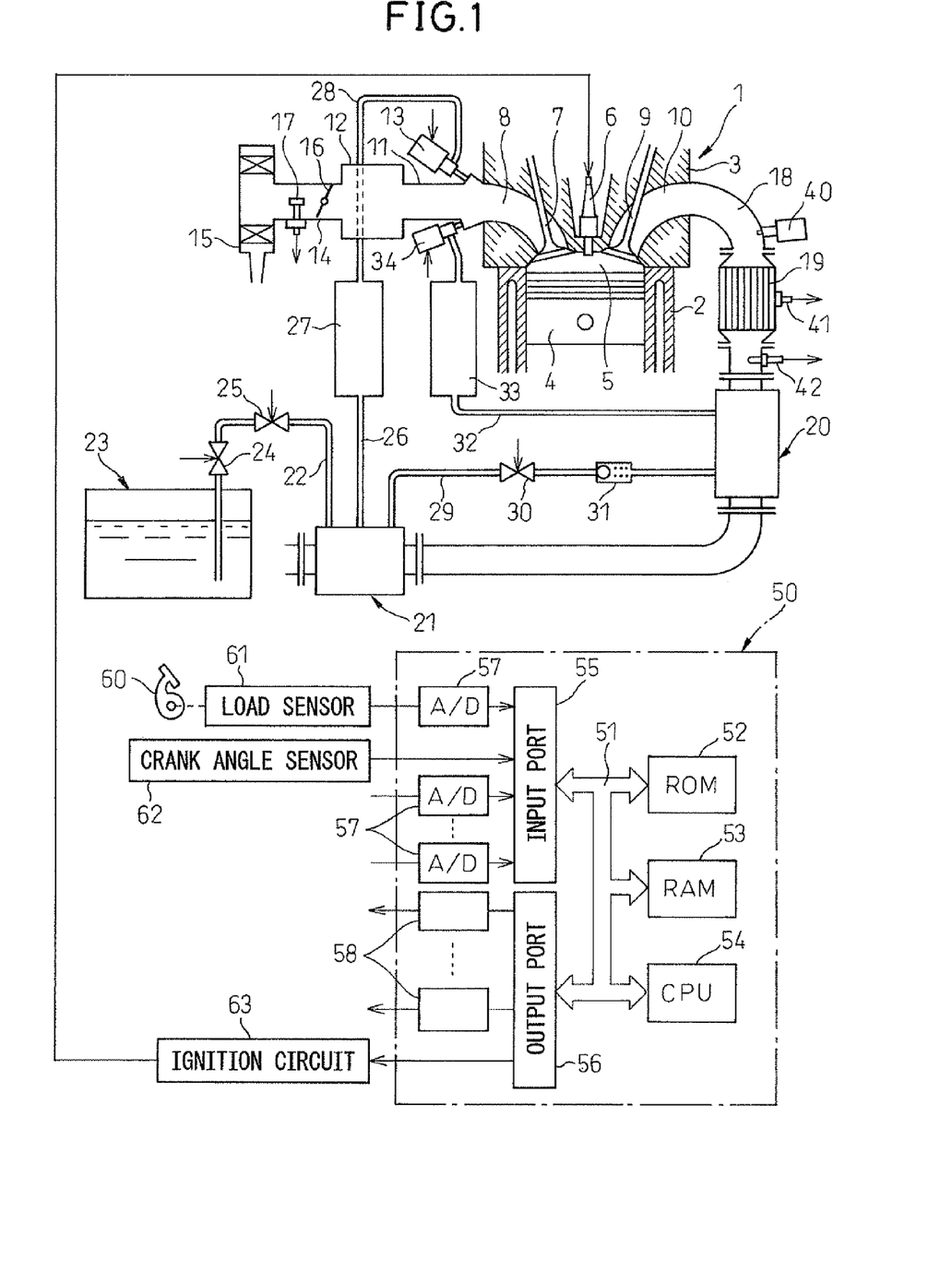
FIG. 1 is an overall view of an internal combustion engine.

Referring to FIG. 1, 1 indicates an internal combustion engine body, 2 a cylinder block, 3 a cylinder head, 4 a piston, 5 a combustion chamber, 6 a plasma jet spark plug emitting a plasma jet, 7 an intake valve, 8 an intake port, 9 an exhaust valve, and 10 an exhaust port. In the internal combustion engine shown in FIG. 1, a first fuel of ammonia and a second fuel which is easier to burn than ammonia are used as fuels. These two types of fuels are fed into the combustion chamber 5 and ignited by the plasma jet spark plug 6.

As this second fuel, use can be made of gasoline, liquefied natural gas, or a reformed gas containing hydrogen obtained by reforming ammonia. FIG. 1 shows a case where use is made of a reformed gas obtained by reforming ammonia and containing hydrogen.

Now, referring to FIG. 1, each intake port 8 is connected through an intake branch pipe 11 to a surge tank 12. In each intake branch pipe 11, an ammonia injector 13 for injecting gaseous ammonia toward the interior of each corresponding intake port 8 is arranged. The surge tank 12 is connected through an intake duct 14 to an air cleaner 15. In the intake duct 14, a throttle valve 16 driven by an actuator and an intake air amount detector 17 using for example a hot wire are arranged. On the other hand, the exhaust port 10 is connected through an exhaust manifold 18 to an exhaust purification catalyst 19 able to reduce $N_2O$ contained in the exhaust gas. In the embodiment shown in FIG. 1, a reformer 20 and a vaporizer 21 are arranged in the exhaust passage downstream of this exhaust purification catalyst 19.

The vaporizer 21 is connected through an ammonia inflow pipe 22 to a fuel tank 23. Inside this ammonia inflow pipe 22, a shutoff valve 24 opening at the time of engine operation and closed when the engine stops and a pressure regulator 25 are arranged. The fuel tank 23 is filled with 0.8 MPa to 1.0 MPa or so high pressure liquid ammonia. Liquid ammonia in the fuel tank 23 is fed through the ammonia inflow pipe 22 into the vaporizer 21. In the embodiment shown in FIG. 1, the vaporizer 21 is formed so as to be heated by the exhaust gas. Therefore, the liquid ammonia fed into the vaporizer 21 is made to vaporize in the vaporizer 21.

The gaseous ammonia which is vaporized in the vaporizer 21 is fed through the ammonia outflow pipe 26 to the ammonia gas tank 27. The gaseous ammonia in the ammonia gas tank 27 is fed through the gaseous ammonia feed pipe 28 to the ammonia injector 13. The gaseous ammonia is injected from the ammonia injector 13 to the corresponding intake port 8.

On the other hand, the vaporizer 21 is connected to the reformer 20 through an ammonia outflow pipe 29. In this ammonia outflow pipe 29, a reformer control valve 30 which is open when the reformer 20 is performing a reform action and a check valve 31 enabling only flow from the vaporizer 21 toward the reformer 20 are arranged in series. When the reformer control valve 30 is open and the pressure in the reformer 20 becomes lower than the pressure in the vaporizer 21, the gaseous ammonia in the vaporizer 21 is fed into the reformer 20 through the ammonia outflow pipe 29.

In the embodiment shown in FIG. 1, the reformer 20 is formed so as to be heated by the exhaust gas. In this reformer 20, a catalyst for promoting the reform action of the ammonia is arranged. When the temperature in the reformer 20 becomes the temperature at which the reform action of ammonia is carried out or more, for example, several hundreds of degrees, the ammonia fed into the reformer 20 from the vaporizer 21 is broken down to hydrogen and nitrogen ($2NH_3 \rightarrow N_2 + 3H_2$), that is, reformed. As a result, reformed gas containing hydrogen is produced in the reformer 20. When ammonia is broken down into hydrogen and nitrogen, the number of moles becomes double. With the addition of the thermal expansion of the reformed gas by heating action as well, the pressure in the reformer 20 rises. This raised pressure reformed gas is fed through a reformed gas feeding pipe 32 into a reformed gas storage tank 33.

As shown in FIG. 1, a second fuel use fuel injector 34 for injecting the reformed gas toward the interior of a corresponding intake port 8 is arranged in each intake branch pipe 11. The reformed gas stored in the reformed gas storage tank 33 is fed to the fuel injector 34. From each fuel injector 34, the reformed gas is injected toward the interior of each corresponding intake port 8.

When gasoline is used as the second fuel, it is not necessary to provide a reformer 20. In this case, the gasoline stored in the gasoline tank is injected from the fuel injector 34. On the other hand, when liquefied natural gas is used as the second fuel as well, it is not necessary to provide the reformer 20. In this case, the liquefied natural gas stored in the liquefied natural gas tank is injected from the fuel injector 34.

On the other hand, as shown in FIG. 1, at the exhaust manifold 18, a secondary air feed valve 40 for feeding secondary air into the exhaust manifold 18 is attached. Further, at the exhaust purification catalyst 19, a temperature sensor 41 for detecting a catalyst temperature of the exhaust purification catalyst 19 is attached. Further, downstream of the exhaust purification catalyst 19, an air-fuel ratio sensor 24 for detecting the air-fuel ratio of the exhaust gas flowing out of the exhaust purification catalyst 19 is arranged.

As shown in FIG. 1, an electronic control unit 50 is comprised of a digital computer provided with a ROM (read only memory) 52, RAM (random access memory) 53, CPU (microprocessor) 54, input port 55, and output port 56 all connected to each other through a bi-directional bus 51. The output signals of the intake air amount detector 17, temperature sensor 41, and air-fuel ratio sensor 42 are input through corresponding AD converters 57 to the input port 55. An accelerator pedal 60 is connected to a load sensor 61 generating an output voltage proportional to the amount of depression of the accelerator pedal 60. The output voltage of the load sensor 61 is input through a corresponding AD converter 57 to the input port 55. Further, a crank angle sensor 62 generating an output pulse each time the crankshaft rotates by for example 30° is connected to the input port 55. On the other hand, the output port 56 is connected to an ignition circuit 63 of the plasma jet spark plug 6. Furthermore, the output port 56 is connected through a corresponding drive circuit 58 to the ammonia injector 13, the drive actuator of the throttle valve 16, shut-off valve 24, pressure regulator 25, reformer control valve 30, fuel injector 34, and secondary air feed valve 40.

Figure 2:
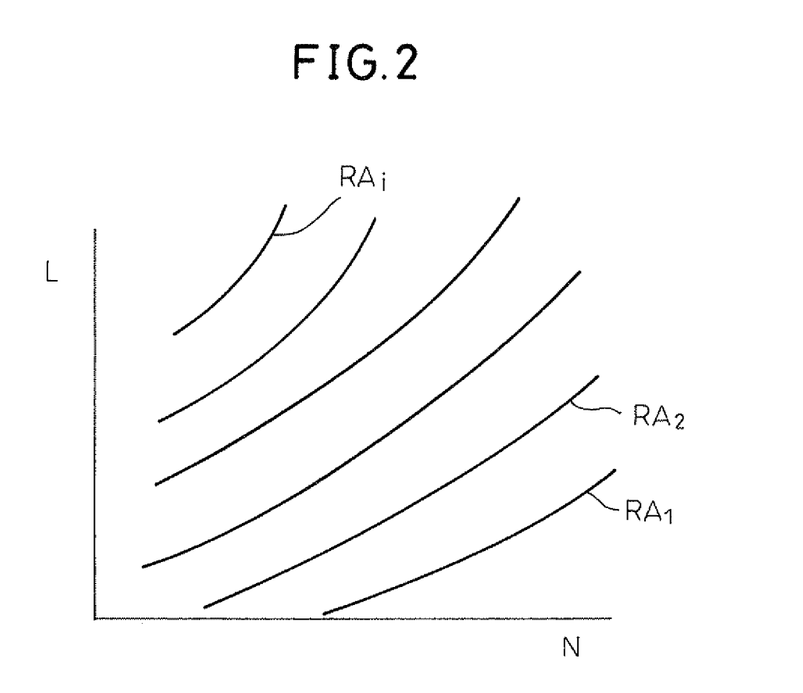
FIG. 2 is a view showing a map of a basic ammonia ratio RA.

FIG. 2 shows a basic ammonia ratio RA (%) showing the ratio of the amount of ammonia fed to the total amount of fuels fed. The solid lines $RA_1$, $RA_2$, ... $RAi$ in FIG. 2 show the equivalent ammonia ratio lines. From $RA_1$ to $RAi$, the ammonia ratio is gradually increased. Note that, in FIG. 2, the ordinate L indicates the engine load, while the abscissa N indicates the engine speed.

Ammonia is harder to burn compared with the second fuel, for example, gasoline. Therefore, to make the mixed gas of ammonia and the second fuel ignite and burn well in the combustion chamber 5, it is necessary to make the ammonia ratio smaller the lower the temperature of the mixed gas at the time of ignition. Therefore in this embodiment according to the present invention, as shown in FIG. 2, the more the engine load L falls, the more the basic ammonia ratio RA is made to fall, while the higher the engine speed N becomes, the more the basic ammonia ratio RA is made to fall.

That is, the lower the engine load L, the smaller the opening degree of the throttle valve 16 is made, so the compression end pressure in the combustion chamber 5 becomes lower the lower the engine load L. Therefore, the temperature of the mixed gas in the combustion chamber 5 at the end of the compression stroke in which ignition is performed becomes lower the lower the engine load L and therefore, as shown in FIG. 2, the basic ammonia ratio RA is made lower when the engine load L falls.

On the other hand, the ignition timing is made earlier the higher the engine speed N and therefore the pressure inside the combustion chamber 5 when the fuel is ignited becomes lower the higher the engine speed N. Therefore, the temperature of the mixed gas in the combustion chamber 5 when the fuel is ignited becomes lower the higher the engine speed N and therefore, as shown in FIG. 2, the basic ammonia ratio RA is made to fall if the engine speed N becomes higher.

The basic ammonia ratio RA shown in FIG. 2 shows the ammonia ratio giving the best combustion as found by experiments. In this embodiment according to the present invention, the basic ammonia ratio RA shown in FIG. 2 is stored in advance in the ROM 52. Normally, the basic ammonia ratio RA stored as the ammonia ratio is used.

Next, a first embodiment according to the present invention will be explained with reference to the timing chart at the time of deceleration shown in FIG. 3. Note that, in FIG. 3, the engine speed N, air-fuel ratio (A/F)g in the combustion chamber 5, air-fuel ratio (A/F)c of the exhaust gas in the exhaust purification catalyst 19, and the change of the ammonia ratio are shown.

Figure 3:
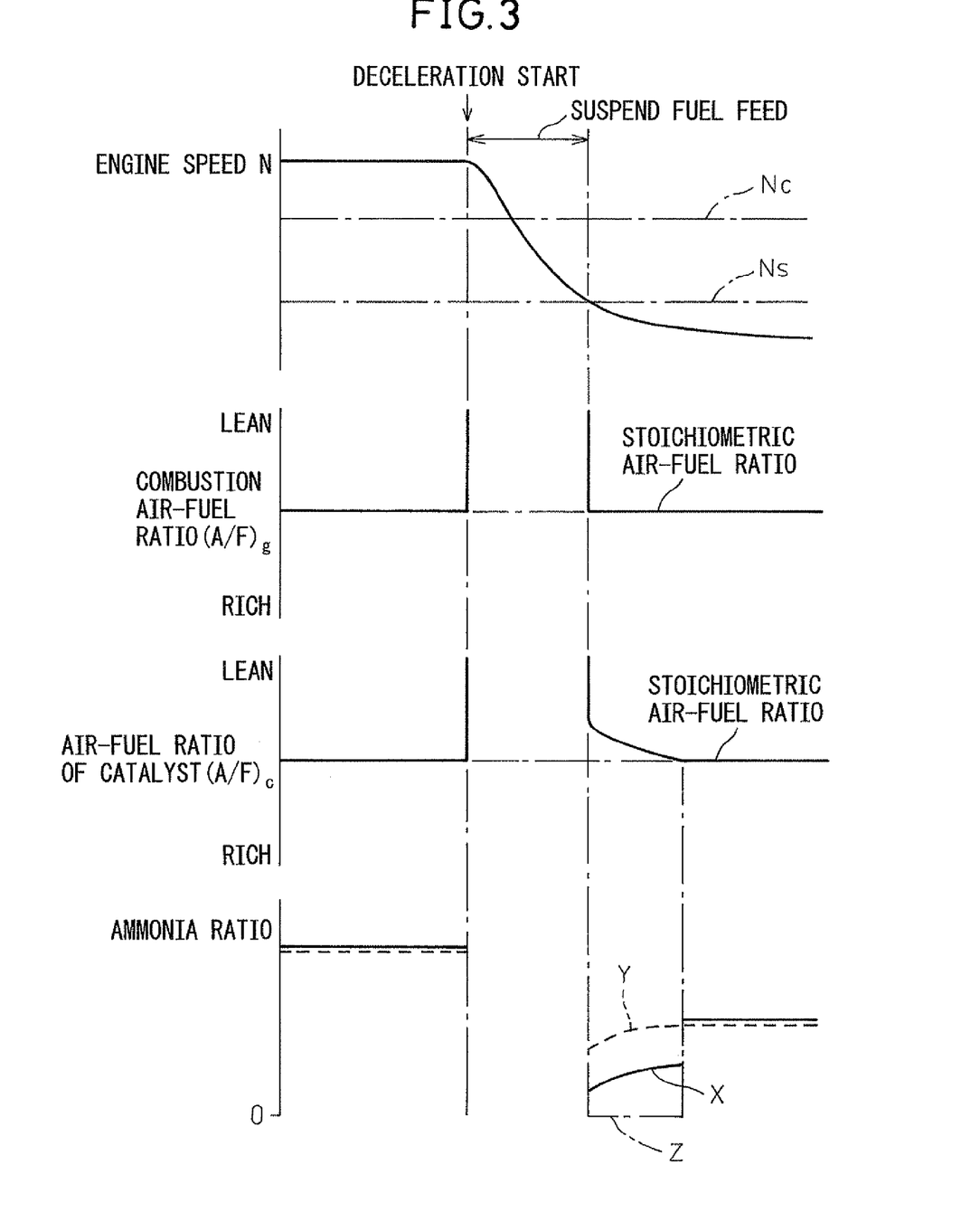
FIG. 3 is a timing chart showing a change of the ammonia ratio etc. at the time of deceleration.

In FIG. 3, Nc indicates a feed suspension lower limit speed. When the accelerator pedal 60 is released and deceleration is commenced, feed of the fuel is suspended if the engine speed N is higher than this feed suspension lower limit speed Nc. On the other hand, in FIG. 3, Ns indicates a resume speed. After the suspension of feed of the fuel, when the engine speed N becomes this resume speed Ns or less, feed of the fuel is restarted. Accordingly, as shown in FIG. 3, feed of the fuel is suspended during a term after the start of deceleration until when the engine speed N is lowered to the resume speed Ns.

On the other hand, as shown in FIG. 3, before the start of deceleration, that is, usually, the combustion air-fuel ratio (A/F)g is the stoichiometric air-fuel ratio. Accordingly, the air-fuel ratio (A/F)c of the exhaust gas in the exhaust purification catalyst 19 is the stoichiometric air-fuel ratio as well. Further, in the ammonia ratio of FIG. 3, the broken line indicates the reference ammonia ratio RA, and a solid line indicates the actual ammonia ratio. As will be understood from FIG. 3, before the start of deceleration, that is, usually, the actual ammonia ratio is made the reference ammonia ratio RA. At this time, ammonia is burned in the combustion chamber 5, therefore $N_2O$ is produced. However, at this time, the air-fuel ratio (A/F)c of the exhaust gas in the exhaust purification catalyst 19 is the stoichiometric air-fuel ratio, therefore the produced $N_2O$ is reduced in the exhaust purification catalyst 19.

On the other hand, when the deceleration is started and the feed of the fuel is suspended, the air-fuel ratio of the exhaust gas in the exhaust purification catalyst 19 becomes lean. Next, injection of the fuel is restarted and the air-fuel ratio (A/F)g is made the stoichiometric air-fuel ratio. However, during the period where the feed of the fuel is suspended, the exhaust purification catalyst 19 is exposed to an excess oxygen atmosphere. Accordingly, during this period, the surface of the body of the exhaust purification catalyst 19 and its pores are filled with oxygen. Namely, the interior of the exhaust purification catalyst 19 become an excess oxygen lean state.

In this regard, if the interior of the exhaust purification catalyst 19 becomes the lean state in this way, even if injection of the fuel is restarted and the air-fuel ratio (A/F)g is made the stoichiometric air-fuel ratio, for a while, the interior of the exhaust purification catalyst 19 is kept at the lean state. Accordingly, at this time, when $N_2O$ is produced by burning of ammonia, this produced $N_2O$ no longer can be reduced in the exhaust purification catalyst 19. As a result, $N_2O$ will be discharged into the atmosphere.

In this case, it is possible to suppress exhaust of $N_2O$ into the atmosphere if the amount of ammonia burned is decreased. Therefore, in this first embodiment, when the feed of the fuel is restarted after suspension of feed of the fuel at the time of deceleration, as indicated by a solid line X in FIG. 3, the ammonia ratio is temporarily made lower than the reference ammonia ratio RA indicated by a broken line Y in accordance with the operating state of the engine. When the ammonia ratio is lowered in this way, the amount of ammonia which is burned decreases. Thus, the produced $N_2O$ decreases. Accordingly, the amount of $N_2O$ discharged into the atmosphere decreases.

Note that, when the interior of the exhaust purification catalyst 19 is in the lean state, the air-fuel ratio (A/F)c of the exhaust gas in the exhaust purification catalyst 19 becomes lean as shown in FIG. 3. At this time, the air-fuel ratio of the exhaust gas flowing out from the exhaust purification catalyst 19 becomes lean as well. Accordingly, in the first embodiment, at the time when feed of the fuel is restarted after suspension of feed of the fuel at the time of deceleration, the ammonia ratio is made lower than the reference ammonia ratio RA in accordance with the operating state of the engine during the period where the air-fuel ratio of the exhaust gas flowing out from the exhaust purification catalyst 19 is lean after the restart of feed of the fuel.

Note that, when the feed of the fuel is restarted after suspension of the feed of the fuel at the time of deceleration, the ammonia ratio may also be made zero as indicated by a dash and dot line Z in FIG. 3. In this case, only the second fuel is fed. When only the second fuel is fed, that is, when the feed of ammonia is suspended, almost no $N_2O$ is produced any longer in the combustion chamber 5, and thus discharge of $N_2O$ into the atmosphere can be further suppressed.

Figure 4:
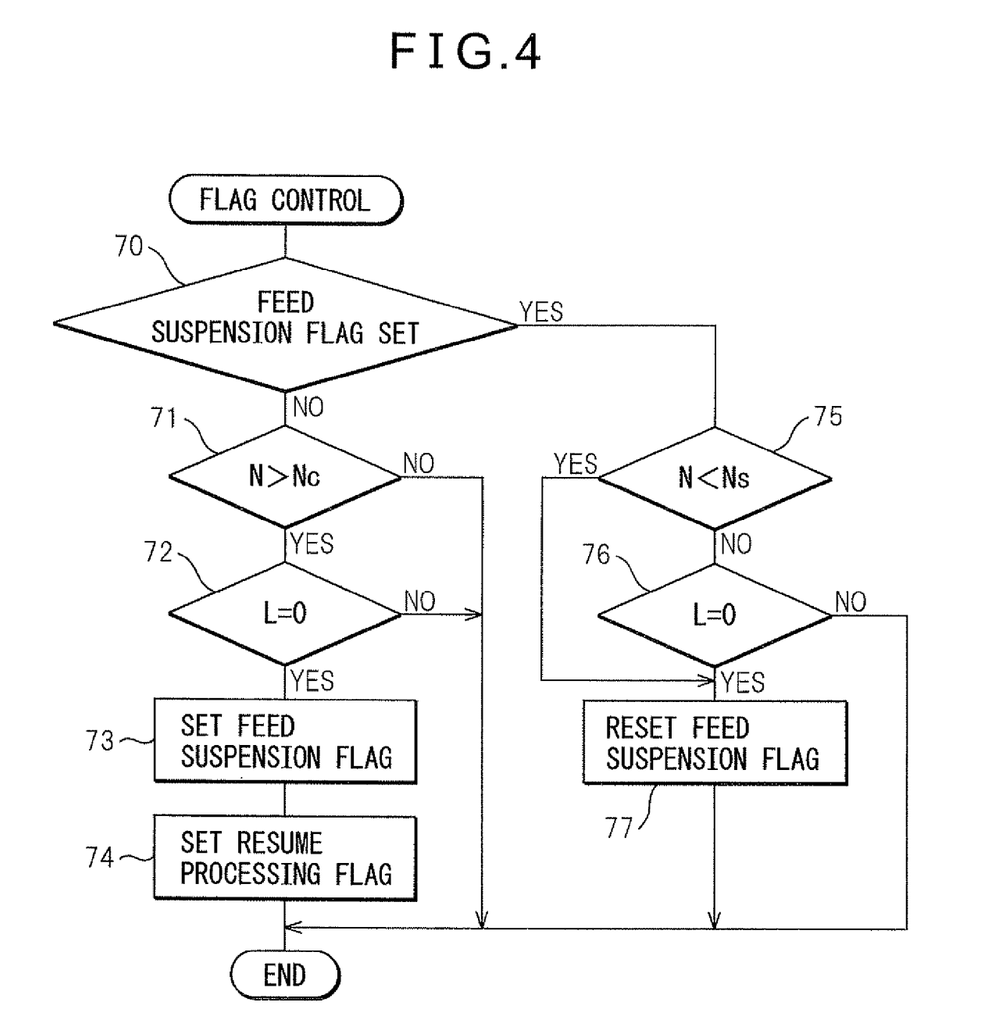
FIG. 4 is a flow chart for controlling a flag.

Next, the control routine of each flag used for the fuel injection control will be explained with reference to FIG. 4. This routine is executed by interruption every constant time. Referring to FIG. 4, first of all, it is determined whether a feed suspension flag indicating that feed of the fuel should be suspended is set. This feed suspension flag is usually reset, therefore the routine proceeds to step 71 where it is determined whether the engine speed N is higher than the feed suspension lower limit speed Nc. When N>Nc, the routine proceeds to step 72 where it is determined whether the engine load L is zero, that is, whether the accelerator pedal 60 is released. When L is not equal to 0, the processing cycle is ended.

On the other hand, when it is determined at step 71 that N>Nc and it is determined at step 72 that L=0, it is determined that the time is one of deceleration when feed of the fuel should be suspended. At this time, the routine proceeds to step 73 where the feed suspension flag is set. Next, at step 74, a resume processing flag indicating that the processing at the time of restart of feed of the fuel is not ended is set.

When the feed suspension flag is set, the routine proceeds from step 70 to step 75 where it is determined whether the engine speed N becomes lower than the resume speed Ns. When N becomes smaller than Ns, the routine proceeds to step 77 where the feed suspension flag is set. On the other hand, when it is determined at step 75 that N≧Ns, the routine proceeds to step 76 where it is determined whether the engine load L is zero. When L becomes not equal to 0, that is, when the accelerator pedal 60 is depressed, the routine proceeds to step 77 where the feed suspension flag is reset.

Figure 5:
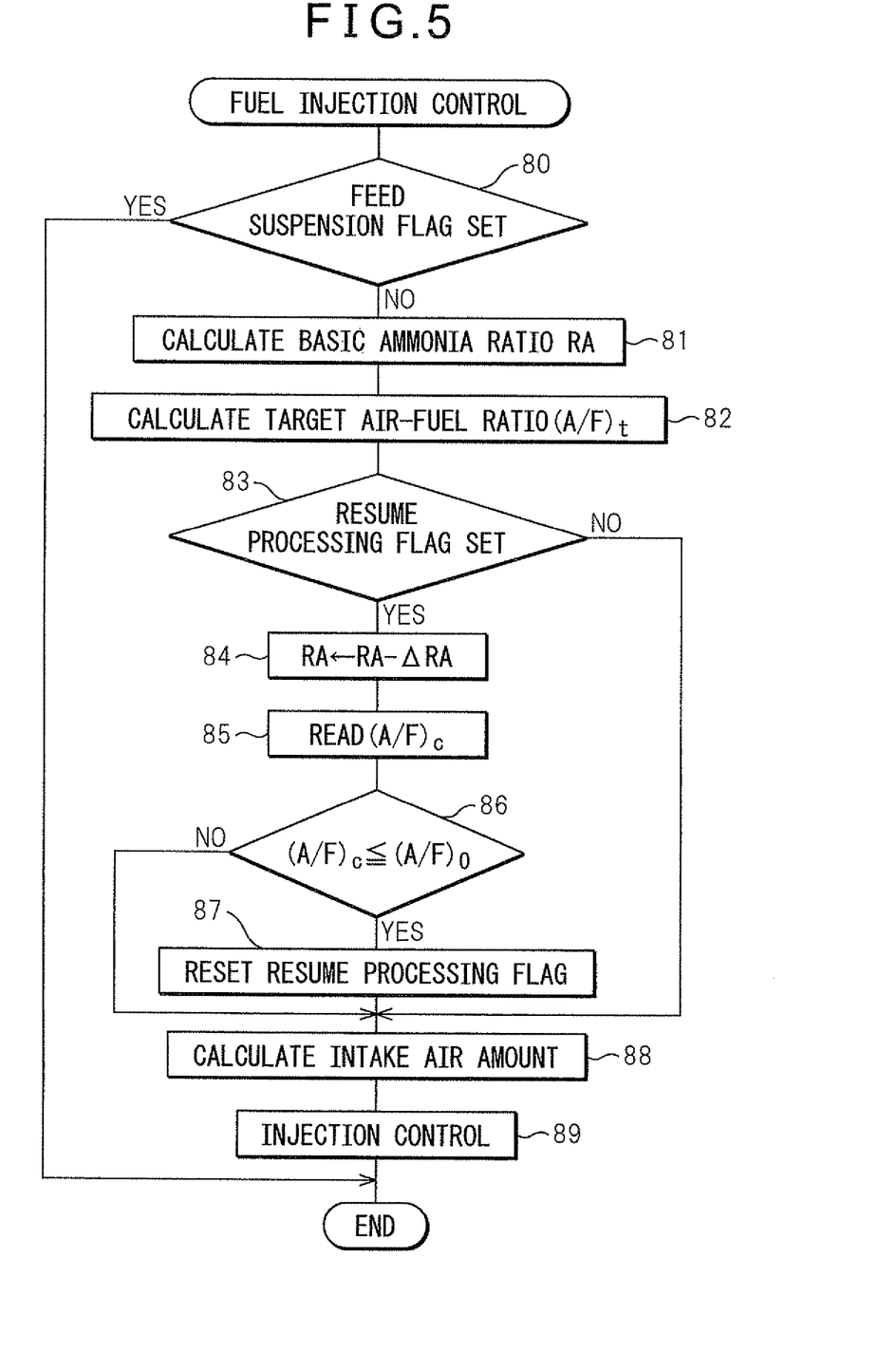
FIG. 5 is a flow chart for fuel injection control.

FIG. 5 shows a fuel injection control routine for executing the first embodiment. This routine is successively executed whenever injection is carried out for each cylinder. Referring to FIG. 5, first of all, at step 80, it is determined whether the feed suspension flag is set. When the feed suspension flag is set, the processing cycle is ended. At this time, feed of the fuel is suspended. Contrary to this, when the feed suspension flag is reset, the routine proceeds to step 81 where injection control of the fuel is carried out.

Namely, at step 81, the basic ammonia ratio RA is calculated from the map shown in FIG. 2. Next, at step 82, a target air-fuel ratio (A/F)t is calculated. In this embodiment, this target air-fuel ratio (A/F)t is set to the stoichiometric air-fuel ratio. Next, at step 83, it is determined whether the resume processing flag is set. When the resume processing flag is not set, the routine jumps to step 88 where the intake air amount detected by the intake air amount detector 17 is read. Next, at step 89, the amount of ammonia to be injected from the ammonia injector 13 and the amount of the second fuel to be injected from the fuel injector 34 are calculated based on the basic ammonia ratio RA, target air-fuel ratio (A/F)t, and intake air amount, and the ammonia and second fuel are injected from the ammonia injector 13 and the fuel injector 34 based on these calculated values.

On the other hand, when it is determined at step 83 that the resume processing flag is set, the routine proceeds to step 84 where the reference ammonia ratio RA is reduced by a certain value ARA. Namely, the ammonia ratio RA targeted at is lowered. In this case, the ammonia ratio RA targeted can be made zero as well. Next, at step 85, the air-fuel ratio (A/F)c of the exhaust gas flowing out from the exhaust purification catalyst 19 detected by the air-fuel ratio sensor 42 is read. Next, at step 86, it is determined whether this air-fuel ratio (A/F)c becomes smaller than the stoichiometric air-fuel ratio (A/F)o.

When it is determined at step 86 that (A/F)c>(A/F)o, that is, when the air-fuel ratio (A/F)c of the exhaust gas flowing out from the exhaust purification catalyst 19 is lean, the routine jumps to step 88. At this time, the fuel injection amount is calculated based on the ammonia ratio RA calculated at step 84. On the other hand, when it is determined at step 86 that (A/F)c≦A/F)o, that is, when the air-fuel ratio (A/F)c of the exhaust gas flowing out from the exhaust purification catalyst 19 becomes the stoichiometric air-fuel ratio or rich, the routine proceeds to step 87 where the resume processing flag is reset. Next, the routine proceeds to step 88.

Figure 6:
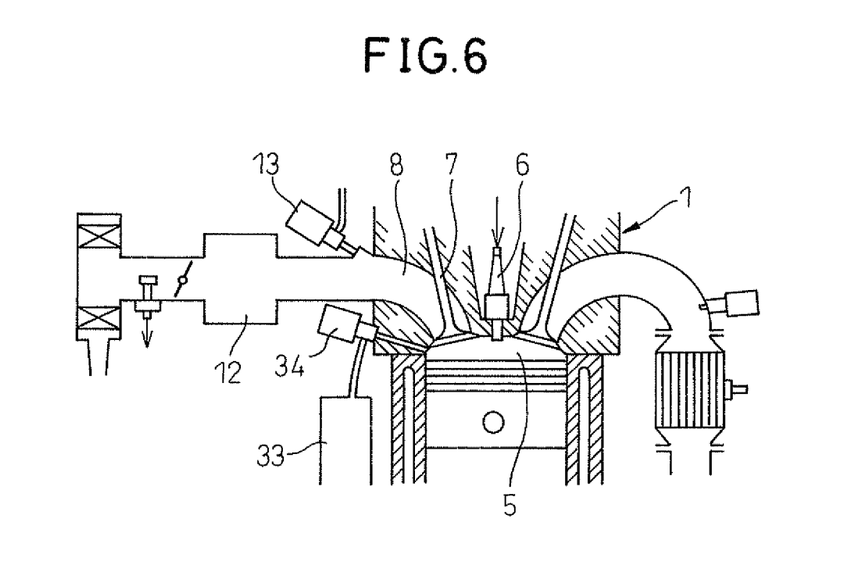
FIG. 6 is an overall view showing another embodiment of the internal combustion engine.

FIG. 6 shows another embodiment of an internal combustion engine for executing a modification of the first embodiment. As shown in FIG. 6, in this modification, the fuel injector 34 is arranged in the combustion chamber 5. In this modification, in a case where the ammonia ratio is made zero and only the second fuel is fed at the time when feed of the fuel is restarted, the second fuel is fed into the combustion chamber 5 at the time of the exhaust stroke. In this modification, by feeding the second fuel into the combustion chamber 5 at the time of the exhaust stroke, after the air-fuel ratio (A/F)c of the exhaust gas flowing out from the exhaust purification catalyst 19 becomes the stoichiometric air-fuel ratio, the fuel begins to be fed into the combustion chamber 5 at a timing where combustion is possible.

Figure 7:
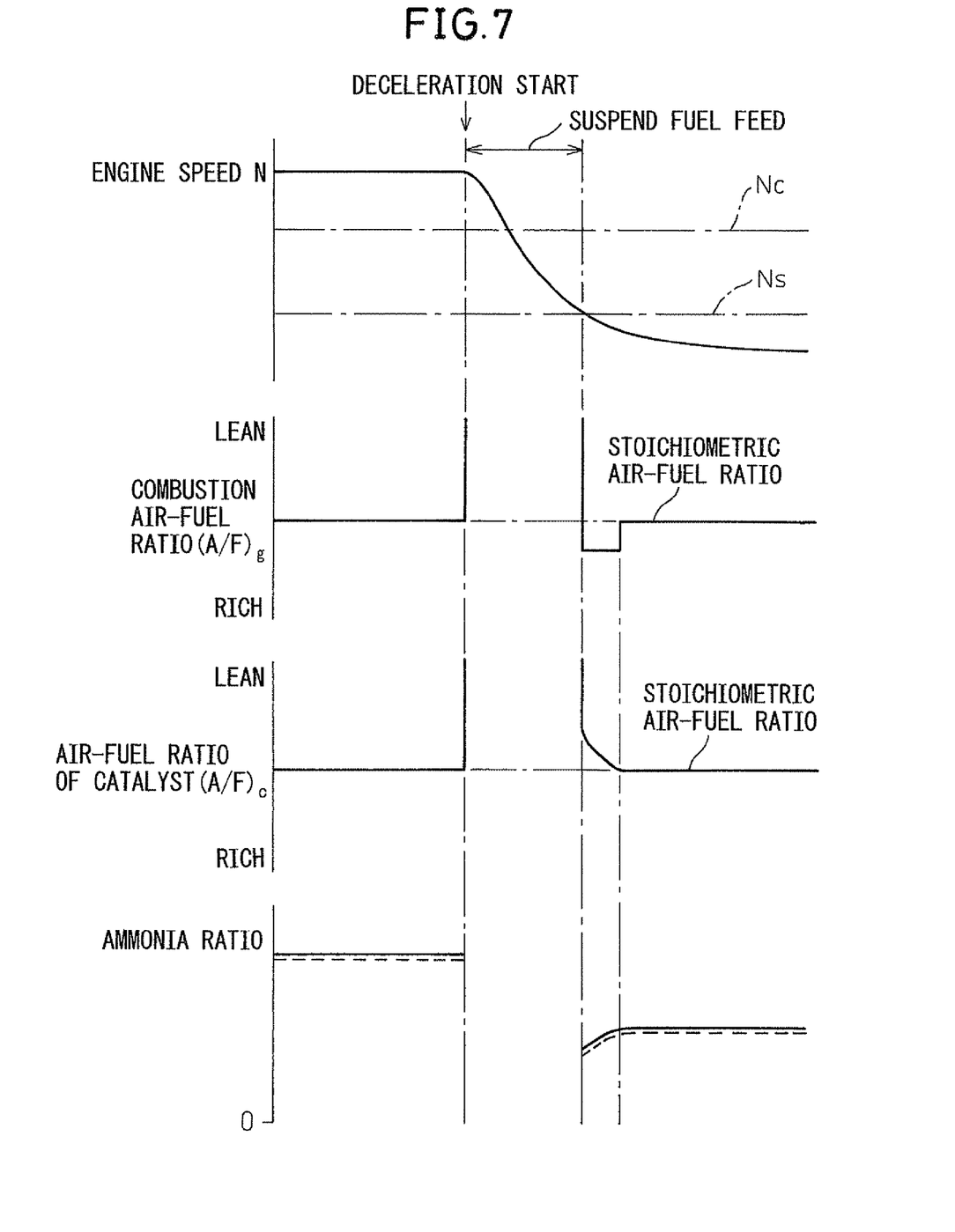
FIG. 7 is a timing chart showing a change of the ammonia ratio etc. at the time of deceleration.

FIG. 7 shows a timing chart of a second embodiment. In this FIG. 7, in the same way as FIG. 3, changes of the engine speed N, air-fuel ratio (A/F)g in the combustion chamber 5, air-fuel ratio (A/F)c of the exhaust gas in the exhaust purification catalyst 19, and the ammonia ratio are shown.

As will be understood from FIG. 7, in this second embodiment, at the time when feed of the fuel is restarted after suspension of feed of the fuel at the time of deceleration, the air-fuel ratio (A/F)g is temporarily made rich. Namely, in this second embodiment, as shown in FIG. 7, the air-fuel ratio is made rich during the period where the air-fuel ratio (A/F)c of the exhaust gas flowing out from the exhaust purification catalyst 19 is lean after the restart of the feed of the fuel. In this way, when the air-fuel ratio is made rich, the time during which the exhaust purification catalyst 19 exhibits a lean state can be made short, and thus discharge of $N_2O$ into the atmosphere can be suppressed.

Further, in this second embodiment, in order to make the air-fuel ratio in the exhaust purification catalyst 19 the stoichiometric air-fuel ratio as early as possible when the fuel injection should be restarted, when the fuel injection should be restarted, the injection action of the fuel is carried out for at least a cylinder to which the fuel should be fed first even when the injection end timing of the fuel is during opening of the intake valve 7. This will be explained with reference to FIG. 8.

Figure 8:
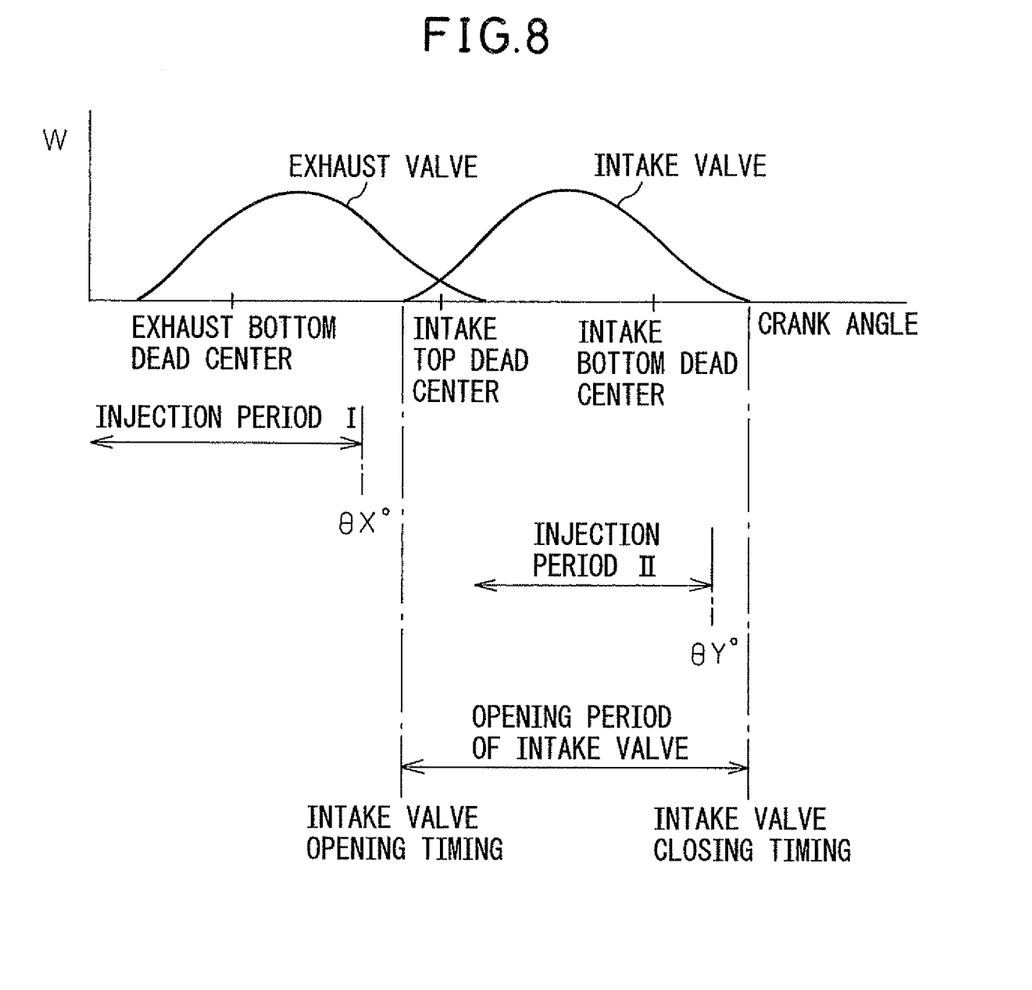
FIG. 8 is a view for explaining an injection timing.

FIG. 8 shows the lift amounts W of the intake valve 7 and the exhaust valve 9 and the fuel injection period. In this second embodiment, normally, synchronous injection is performed where fuel is successively injected for each cylinder according to an ignition sequence. The injection period at the time when this synchronous injection is carried out is shown in FIG. 8 as an injection period I. When synchronous injection is carried out, the injection period I is set so that the fuel injection is completed at a crank angle θX a bit before the opening of the intake valve 7 so that all injection fuel is fed into the combustion chamber 5.

However, when such synchronous injection is constantly carried out, if the start timing of the injection period I has already passed for a cylinder to which the fuel should be fed first when the fuel injection should be restarted at the time of deceleration, the fuel injection is not carried out for this cylinder. However, when the fuel injection is suspended for the cylinder to which the fuel should be fed first in this way, a long time is required until the air-fuel ratio in the exhaust purification catalyst 19 is made the stoichiometric air-fuel ratio.

In this case, as indicated by an injection timing II in FIG. 8, if the end timing of the fuel injection is retarded to a crank angle θY which is a bit before closing of the intake valve 7, that is, if asynchronous injection retarding the injection timing is carried out, sometimes the fuel can be fed to the cylinder to which the fuel should be fed first. In such a case, if fuel injection is carried out, the air-fuel ratio (A/F)c in the exhaust purification catalyst 19 becomes the stoichiometric air-fuel ratio at an earlier stage. Thus, it becomes possible to commence combustion of a fuel having a high ammonia ratio at an early stage. Therefore, in this second embodiment, asynchronous injection of the fuel is carried out even when the injection end timing of the fuel is during opening of the intake valve 7 as indicated by the injection period II of FIG. 8 for at least the cylinder to which the fuel should be fed first.

Figure 9:
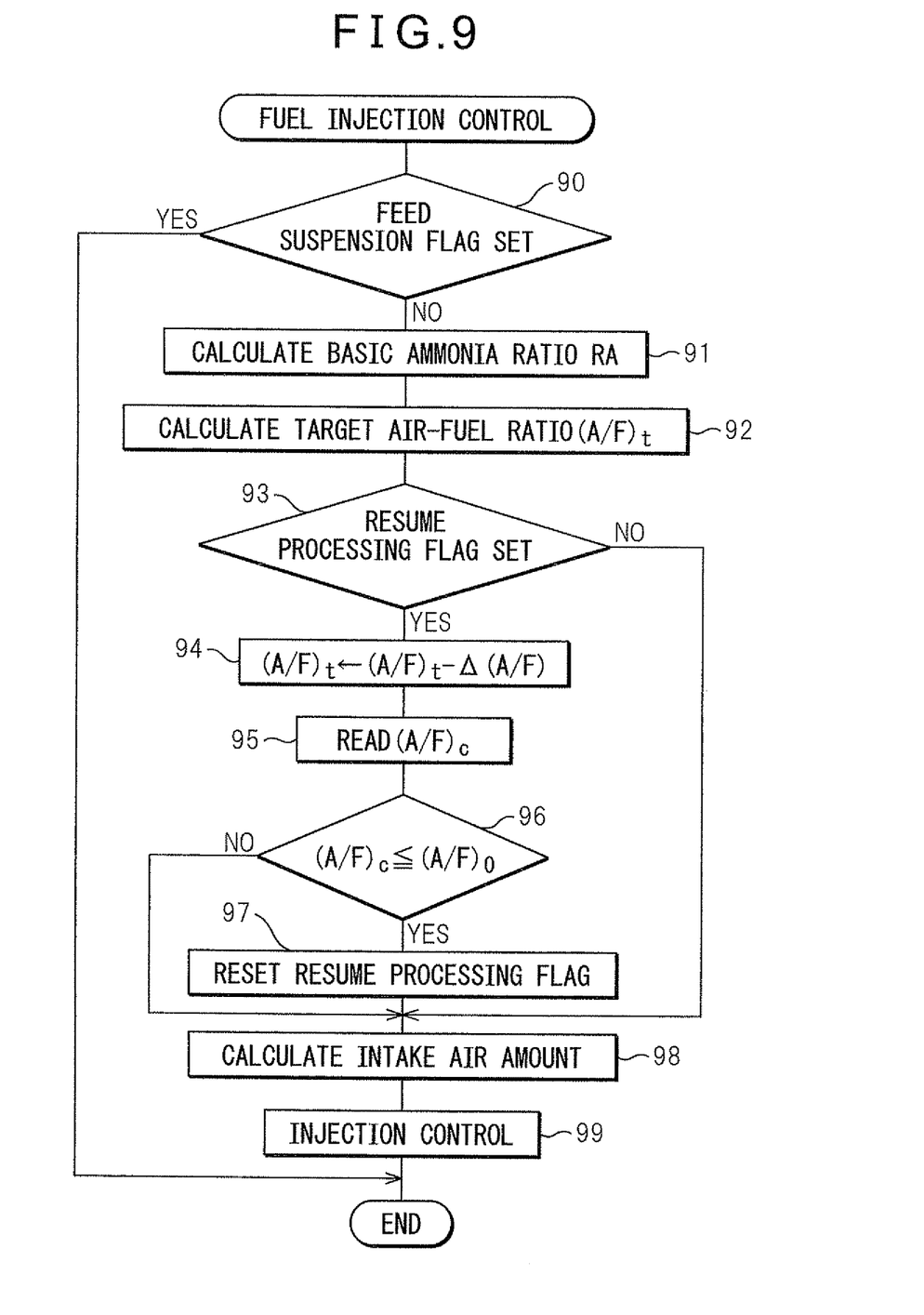
FIG. 9 is a flow chart for fuel injection control.

FIG. 9 shows a fuel injection control routine for executing a second embodiment. This routine is basically the same as the routine shown in FIG. 5 and only differs in part. Namely, referring to FIG. 9, first of all, at step 90, it is determined whether the feed suspension flag is set. When the feed suspension flag is not set, the routine proceeds to step 91 where the basic ammonia ratio RA is calculated from a map shown in FIG. 2. Next, at step 92, the target air-fuel ratio (A/F)t is calculated. In this embodiment as well, the target air-fuel ratio (A/F)t is set to the stoichiometric air-fuel ratio.

Next, at step 93, it is determined whether the resume processing flag is set. When the resume processing flag is not set, the routine jumps to step 98 where the intake air amount detected by the intake air amount detector 17 is read. Next, at step 99, the amount of ammonia to be injected from the ammonia injector 13 and the amount of the second fuel to be injected from the fuel injector 34 are calculated based on the basic ammonia ratio RA, target air-fuel ratio (A/F)t, and the intake air amount, and the ammonia and second fuel are injected from the ammonia injector 13 and the fuel injector 34 based on these calculated values. At this time, synchronous injection indicated by the injection period I in FIG. 8 is carried out.

On the other hand, when it is determined at step 93 that the resume processing flag is set, the routine proceeds to step 94 where the target air-fuel ratio (A/F)t is reduced by a certain value Δ(A/F). Namely, the target air-fuel ratio is made a rich air-fuel ratio. Next, at step 95, the air-fuel ratio (A/F)c of the exhaust gas flowing out from the exhaust purification catalyst 19 which is detected by the air-fuel ratio sensor 42 is read. Next, at step 96, it is determined whether this air-fuel ratio (A/F)c becomes smaller than the stoichiometric air-fuel ratio (A/F)o.

When it is determined at step 96 that (A/F)c>(A/F)o, that is, when the air-fuel ratio (A/F)c of the exhaust gas flowing out from the exhaust purification catalyst 19 is lean, the routine jumps to step 98 where the routine proceeds to step 99. At this time, the injection action of the fuel is carried out for at least the cylinder to which the fuel should be fed first even when the injection end timing of the fuel becomes during opening of the intake valve 7. On the other hand, when it is determined at step 96 that (A/F)c≦(A/F)o, that is, when the air-fuel ratio (A/F)c of the exhaust gas flowing out from the exhaust purification catalyst 19 becomes the stoichiometric air-fuel ratio or rich, the routine proceeds to step 97 where the resume processing flag is reset. Next, the routine proceeds to step 98.

In this regard, when the air-fuel ratio (A/F)g is made rich at the time of restart of feed of the fuel as in this second embodiment, the amount of the unburnt ammonia exhausted from the combustion chamber 5 increases. Accordingly, in the modification of the second embodiment, when the combustion air-fuel ratio (A/F)g is made rich in order to oxidize the unburned ammonia exhausted from the combustion chamber 5, the secondary air is fed from the secondary air feed valve 40 into the exhaust manifold 18.

Figure 10:
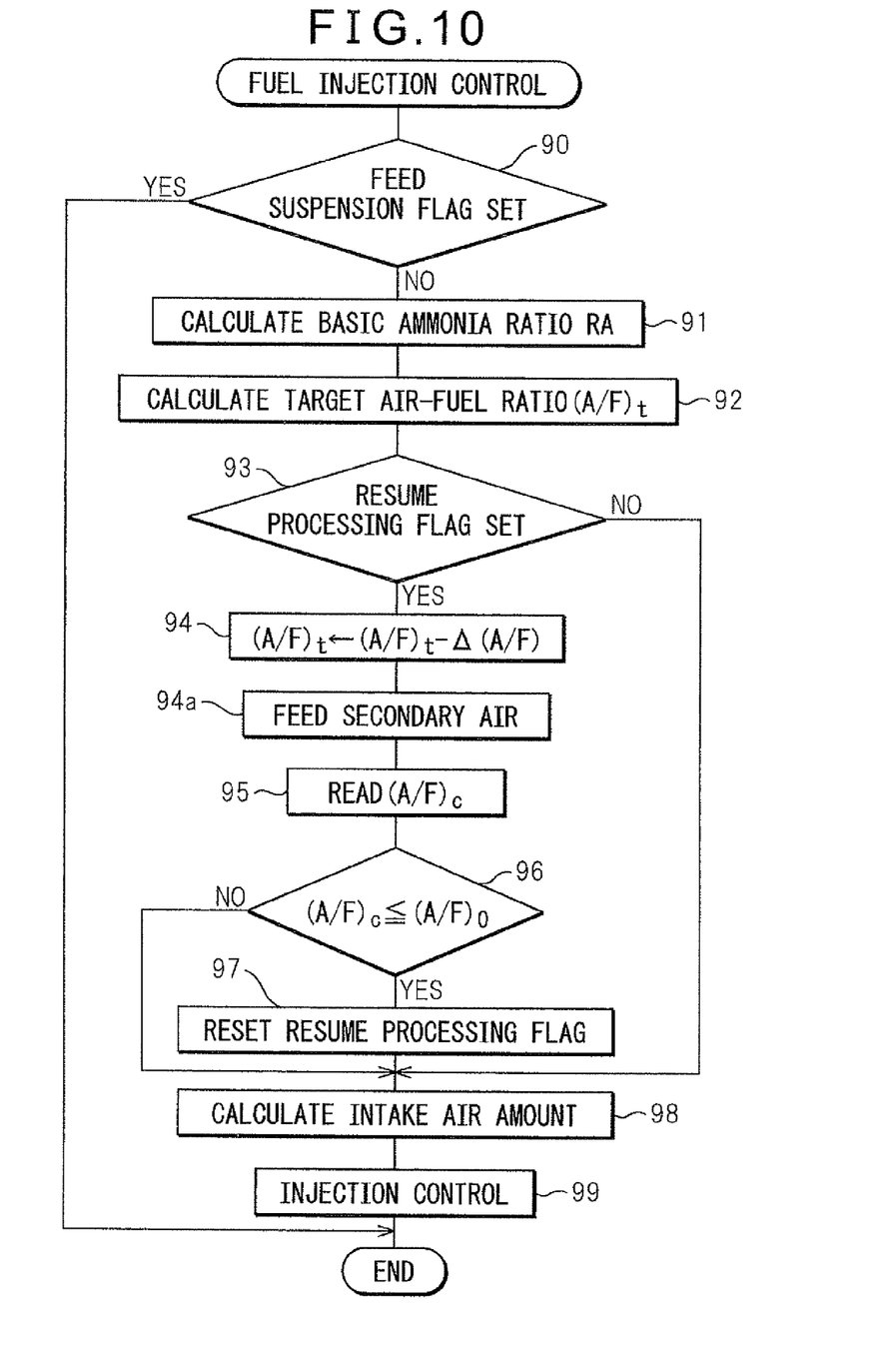
FIG. 10 is a flow chart for fuel injection control.

FIG. 10 shows a fuel injection control routine for executing this modification of the second embodiment. The difference between the routine shown in FIG. 10 and the routine shown in FIG. 9 is only that step 94a is added after step 94 in the routine shown in FIG. 10. Namely, in the routine shown in FIG. 10, when it is determined at step 93 that the resume processing flag is set and, in step 94, the target air-fuel ratio (A/F)t is made a rich air-fuel ratio, the routine proceeds to step 94a and the secondary air is fed from the secondary air feed valve 40.

Next, a third embodiment will be explained with reference to FIG. 11. As explained before, the reduction action of $N_2O$ is not carried out well in the exhaust purification catalyst 19 when the exhaust purification catalyst 19 is not activated. At this time, in order to suppress discharge of $N_2O$ into the atmosphere, it is necessary to decrease the amount of ammonia to be burned, that is, to lower the ammonia ratio. Accordingly, in this third embodiment, as shown in FIG. 11, when the temperature TC of the exhaust purification catalyst 19 is lower than a predetermined set temperature $T_0$, the reduction ΔR of the ammonia ratio is increased, and thus, the ammonia ratio is made lower than the reference ammonia ratio RA in accordance with the operating state of the engine.

Figure 11:
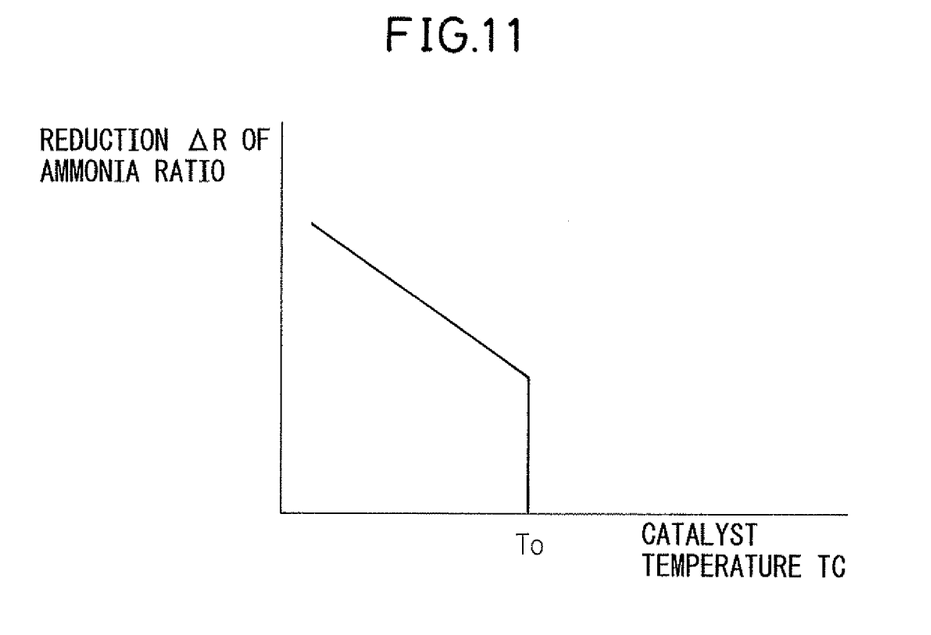
FIG. 11 is a view showing a reduction ΔR of the ammonia ratio.

Note that, in the example shown in FIG. 11, the set temperature $T_0$ is made the activation temperature of the exhaust purification catalyst 19. Accordingly, in the example shown in FIG. 11, when the temperature TC of the exhaust purification catalyst 19 becomes the activation temperature $T_o$ or less, the ammonia ratio is abruptly lowered. In a temperature zone of $TC<T_0$, as the catalyst temperature TC becomes lower, the ammonia ratio is gradually lowered.

Figure 12:
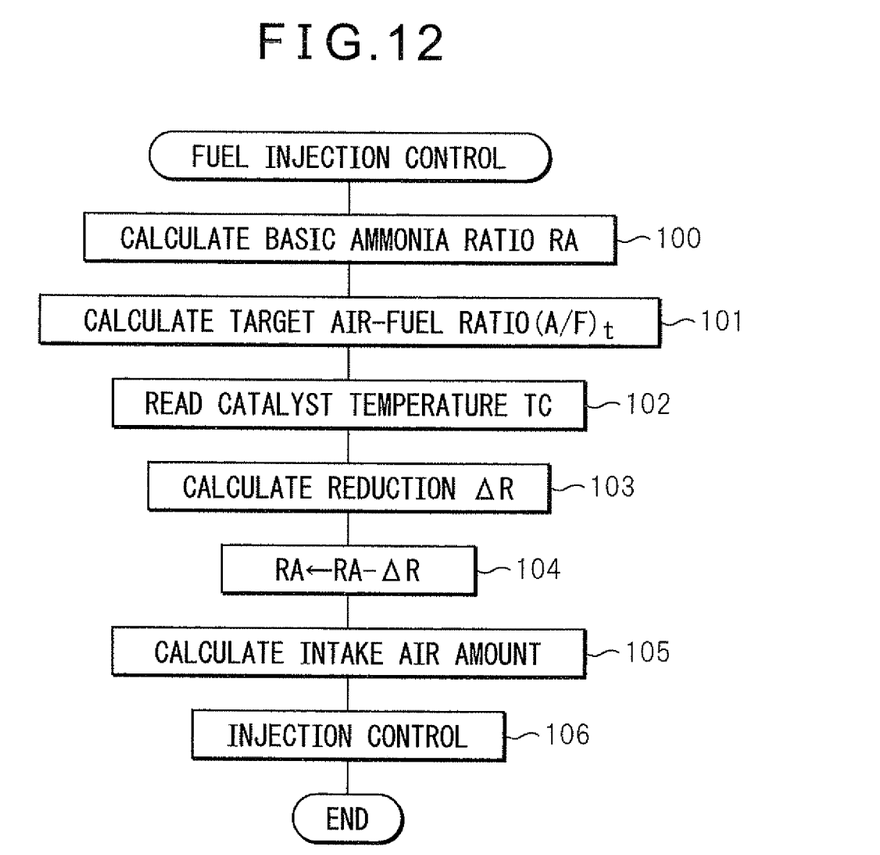
FIG. 12 is a flow chart for fuel injection control.

FIG. 12 shows a fuel injection control routine for executing a third embodiment. Referring to FIG. 12, first of all, at step 100, the basic ammonia ratio RA is calculated from the map shown in FIG. 2. Next, at step 101, the target air-fuel ratio (A/F)t is calculated. In this embodiment as well, this target air-fuel ratio (A/F)t is set to the stoichiometric air-fuel ratio. Next, at step 102, the temperature TC of the exhaust purification catalyst 19 detected by the temperature sensor 41 is read. Next, at step 103, the reduction ΔR of ammonia is calculated from the relationship shown in FIG. 11.

Next, at step 104, the reference ammonia ratio RA is reduced by the reduction ΔR. Namely, if ΔR>0 at this time, the ammonia ratio RA targeted is lowered. Next, at step 105, the intake air amount detected by the intake air amount detector 17 is read. Next, at step 106, the amount of ammonia to be injected from the ammonia injector 13 and the amount of the second fuel to be injected from the fuel injector 34 are calculated based on the ammonia ratio RA, target air-fuel ratio (A/F)t, and intake air amount calculated at step 104, and the ammonia and second fuel are injected from the ammonia injector 13 and the fuel injector 34 based on these calculated values.

While the invention has been described with reference to specific embodiments chosen for purpose of illustration, it should be apparent that numerous modifications could be made thereto by those skilled in the art without departing from the basic concept and scope of the invention.

The invention claimed is:

1. A control system of an internal combustion engine using as a fuel a first fuel of ammonia and a second fuel which is easier to burn than ammonia and feeding these two types of fuel into a combustion chamber to burn, wherein a reference ammonia ratio indicating a ratio of an amount of ammonia fed to a total amount of fuels fed is set in advance in accordance with an operating state of the engine, an ammonia ratio is usually set to the reference ammonia ratio in accordance with the operating state of the engine, and the ammonia ratio is temporarily made lower than the reference ammonia ratio in accordance with the operating state of the engine at the time when feed of the fuels is restarted after feed of the fuels is suspended at the time of deceleration.

2. A control system of an internal combustion engine as claimed in claim 1, wherein when feed of the fuel is restarted after suspension of feed of the fuel at the time of deceleration, the ammonia ratio is made zero and only the second fuel is fed.

3. A control system of an internal combustion engine as claimed in claim 2, wherein the second fuel is fed into the combustion chamber at the time of an exhaust stroke.

4. A control system of an internal combustion engine as claimed in claim 1, wherein at the time when feed of the fuel is restarted after suspension of feed of the fuel at the time of deceleration, the ammonia ratio is made lower than the reference ammonia ratio in accordance with the operating state of the engine during the period where an air-fuel ratio of an exhaust gas flowing out from an exhaust purification catalyst arranged in an engine exhaust passage is lean after the restart of feed of the fuel.

5. A control system of an internal combustion engine using as a fuel a first fuel of ammonia and a second fuel which is easier to burn than ammonia and feeding these two types of fuels into a combustion chamber to burn, wherein the fuels are injected toward an interior of an intake port of each cylinder so that normally, an injection is completed before opening of a corresponding intake valve and, at the time when feed of the fuels is restarted after feed of the fuels is suspended at the time of deceleration, an air-fuel ratio is temporarily made rich and an injection action of the fuel is carried out for at least a cylinder to which the fuel should be fed first even when an injection end timing of the fuel is during opening of an intake valve.

6. A control system of an internal combustion engine as claimed in claim 5, wherein secondary air is fed into an engine exhaust passage when the air-fuel ratio is temporarily made rich.

7. A control system of an internal combustion engine as claimed in claim 5, wherein at the time when feed of the fuel is restarted after suspension of feed of the fuel at the time of deceleration, during the period where an air-fuel ratio of an exhaust gas flowing out from an exhaust purification catalyst arranged in an engine exhaust passage is lean after the restart of feed of the fuel, the air-fuel ratio is made rich, and an injection action of the fuel is carried out for at least a cylinder to which the fuel should be fed first even when the injection end timing of the fuel is during opening of the intake valve.

8. A control system of an internal combustion engine using as a fuel a first fuel of ammonia and a second fuel which is easier to burn than ammonia and feeding these two types of fuels into a combustion chamber to burn, wherein a reference ammonia ratio indicating a ratio of an amount of ammonia fed to a total amount of fuels fed is set in advance in accordance with an operating state of the engine, an ammonia ratio is normally set to the reference ammonia ratio in accordance with the operating state of the engine, and the ammonia ratio is made lower than the reference ammonia ratio in accordance with the operating state of the engine at the time when a temperature of an exhaust purification catalyst arranged in an engine exhaust passage is lower than a predetermined set temperature.

* * * * *